(12) United States Patent
Biagiotti et al.

(10) Patent No.: US 8,497,908 B1
(45) Date of Patent: Jul. 30, 2013

(54) UNIFIED VIDEO TEST APPARATUS (75) Inventors: William Biagiotti, St. James, NY (US); Eli Levi, Dix Hills, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 49 days.

(21) Appl. No.: 13/324,240

(22) Filed: Dec. 13, 2011

(51) Int. Cl.
*H04N 17/00* (2006.01)

(52) U.S. Cl.
USPC .......................................... 348/180; 348/181

(58) Field of Classification Search
USPC ............. 348/180, 181; 361/679.01, 728–730, 361/736, 737; 340/653, 657; 345/440, 16, 345/904; 702/57, 117, 118; 324/537, 750.26, 324/756.01, 756.05, 756.07, 763.01, 763.02; 445/63
See application file for complete search history.

(56) References Cited

U.S. PATENT DOCUMENTS

| | | | |
|---|---|---|---|
| 3,740,743 A | 6/1973 | Baron | |
| 4,336,476 A | 6/1982 | Holland et al. | |
| 4,338,673 A | 7/1982 | Brown | |
| 4,466,014 A | 8/1984 | Wilensky et al. | |
| 4,513,318 A | 4/1985 | Wilensky et al. | |
| 4,554,636 A | 11/1985 | Maggi et al. | |
| 4,554,663 A | 11/1985 | Pham van Cang | |
| 4,631,532 A | 12/1986 | Grothe | |
| 4,635,050 A | 1/1987 | Grothe et al. | |
| 4,635,096 A | 1/1987 | Morgan | |
| 4,718,018 A | 1/1988 | Sloane et al. | |
| 4,736,330 A | 4/1988 | Capowski | |
| 4,754,334 A | 6/1988 | Kriz et al. | |
| 4,812,713 A | 3/1989 | Blanchard | |
| 4,847,603 A | 7/1989 | Blanchard | |
| 4,974,080 A | 11/1990 | Fritchie et al. | |
| 5,003,393 A | 3/1991 | Riegel | |
| 5,055,928 A | 10/1991 | Klingelhofer | |
| 5,122,863 A | 6/1992 | Zortea | |
| 5,274,445 A | 12/1993 | Overton et al. | |
| 5,319,446 A | 6/1994 | Emmoto et al. | |
| 5,521,615 A | 5/1996 | Boyan | |
| 5,572,444 A * | 11/1996 | Lentz et al. ................... | 702/117 |
| 5,664,153 A * | 9/1997 | Farrell .......................... | 711/154 |
| 5,710,573 A | 1/1998 | Hung et al. | |
| 5,781,231 A | 7/1998 | Reynolds | |
| 5,790,114 A | 8/1998 | Geaghan et al. | |
| 5,825,407 A * | 10/1998 | Cowe et al. ................... | 725/143 |
| 5,842,006 A | 11/1998 | Harvey et al. | |
| 5,874,991 A | 2/1999 | Steinberg et al. | |
| 5,920,340 A | 7/1999 | Man et al. | |
| 5,969,699 A | 10/1999 | Balram et al. | |
| 6,396,536 B1 | 5/2002 | Howell et al. | |
| 6,496,160 B1 | 12/2002 | Tanner et al. | |
| 6,985,977 B2 | 1/2006 | Vrancic | |

(Continued)

*Primary Examiner* — Victor Kostak
(74) *Attorney, Agent, or Firm* — Brian Roffe (57) ABSTRACT

Arrangement of circuit cards and enclosures in a unified video test apparatus wherein the circuit boards may be arranged within a single enclosure, having a size spanning two slots of an instrument chassis wherein each circuit board includes none, some or all of the functional modules of the video test apparatus. Alternatively, the circuit boards are arranged in different enclosures, with each circuit board including some of the functional modules of the video test apparatus, and the different enclosures may be arranged in a common instrument chassis or in different instrument chassis. A single or multiple software interfaces in a host computer can control the functional modules in the different enclosures in the same or different chassis to cause the arrangement to appear as a homogenous instrument regardless of location of the functional modules, and coordinates interaction between the functional modules.

46 Claims, 6 Drawing Sheets

U.S. PATENT DOCUMENTS

| | | |
|---|---|---|
| 7,253,792 B2 | 8/2007 | Biagiotti et al. |
| 7,289,159 B1 | 10/2007 | Biagiotti et al. |
| 7,495,674 B2 | 2/2009 | Biagiotti et al. |
| 7,617,063 B2 * | 11/2009 | Tiegs ............................ 702/108 |
| 7,768,533 B2 | 8/2010 | Biagiotti et al. |
| 7,978,218 B2 | 7/2011 | Biagiotti et al. |
| 2002/0047902 A1 * | 4/2002 | Thomas et al. ................ 348/180 |
| 2010/0239025 A1 * | 9/2010 | Veljkovic et al. ......... 375/240.25 |

* cited by examiner

UNIFIED VIDEO TEST APPARATUS

FIELD OF THE INVENTION

The present invention relates generally to the field of automatic test equipment for the testing of electronic signals generated by equipment under test including, but not limited to, complex video signals. More specifically, this invention relates to circuit board configuration and enclosure packaging of a video asset or video test instrument and the programming interface to the instrument.

BACKGROUND OF THE INVENTION

Automatic test equipment for testing standard format video devices is known. It is commonly required to evaluate the performance and functionality of a non-standard video unit under test (UUT) to determine if the UUT is operating within the manufacturer's specifications. Specifically, the UUT may require special image and scan formats, voltage levels, and timing signals. In addition, fault simulation may be required to verify the UUT's functionality.

Video signals can be generated by a wide variety of instruments employing diverse methods. In most available types, the image format, sync format and timing are limited to a set of known types primarily to support commercial display devices. Also, any UUT specific timing signals, related to the video signal but not part of it, often must be created by the use of ancillary equipment.

Due to flexibility of current technology, it is possible, and even advantageous, to separate the functions of a multi-function test instrument onto separate circuit boards or separate enclosures, and even separate chassis' to accommodate the limited availability of empty space inside of a test chassis or test bench. Innovative software techniques make it possible for the separated elements to function, and even appear, as though they were one homogenous instrument.

OBJECTS AND SUMMARY OF THE INVENTION

It is an object of the present invention to provide a versatile video asset or packaging arrangement of functional modules which are used to generate and validate video signals, audio signals or other electrical signals. A versatile packaging arrangement is a highly desirable feature for instances where available chassis space is not consolidated into a single suitable location.

In order to achieve this object and possibly others, the functional modules of interest which are part of a comprehensive video test instrument in accordance with the invention include one or more of the following, and any and all combinations thereof:
1. Primary Composite Video generation module;
2. Digital Video generation module;
3. Raster Video generation module;
4. Stroke Video generation module;
5. Secondary Composite Video generation module;
6. Real Time Video Capture module with analysis capabilities;
7. Real Time Video Reformat and/or Video Redisplay module; and
8. Bus Interface module (including, but not limited to, VXI, MXI-2, LXI, PCI, PXI, PCI-e buses).

A video processing arrangement in accordance with the invention includes a computer adapted to connect to a monitor and a video asset coupled to the computer for generating video signals that can be displayed on the monitor when connected to the computer. This video asset comprises at least one enclosure, at least one circuit board arranged in an interior of the enclosure(s), and functional modules or primary elements all arranged on the circuit board(s) in the interior of the enclosure(s).

Briefly, the primary composite video generation module produces different types of a primary video signal and outputs the primary video signal via output channels. The stroke video generator module generates a stroke XYZ video signal and outputs the stroke video signal via output channels. The secondary composite video generation module produces a secondary composite video signal and outputs the secondary composite video signal via output channels. The secondary composite video generation module produces the secondary composite video signal in an identical or different format than the primary video signal and different than the primary video signal. The function of the other modules and the interrelation of the modules to on another are disclosed in U.S. Pat. No. 7,978,218, assigned to the current assignee, and which is incorporated by reference herein.

BRIEF DESCRIPTION OF THE DRAWINGS

The following drawings are illustrative of embodiments of the invention and are not meant to limit the scope of the invention as encompassed by the claims.

DETAILED DESCRIPTION OF PREFERRED EMBODIMENTS

The methods of this invention are generally based on the concepts described in the '218 patent, which describes advantageous combinations of video functional modules that are packaged within a desirable single (enclosure) slot design. The merits of the '218 patent are based upon the improvements of technology used to miniaturize and reduce the space required by electronic circuitry and applied to innovative combinations of video functional modules, further minimized by sharing common functionality, to exist within a minimum amount of space, i.e., a single instrument card slot, enabling a compact fully comprehensive video test instrument. The methods of the present invention detail further innovation by segregating the packaging of the functional modules in instances where the combination of features do not permit the modules to coexist in the same physical space.

As video technology further evolves, more video formats and functions are added to the existing testing repertoire for video formats. The physical space required by these additional functional modules may exceed that which is available in the individual spaces of the encompassing system. In some embodiments disclosed in the '218 patent, individual designs of listed functional modules may exceed available system space due to the implementation or the skill of the designer. It becomes an identified need to identify innovative alternate packaging arrangements of the video functional modules.

In preferred embodiments of the present invention, the arrangement of video functional modules is altered from that suggested in the '218 patent. The present invention specifies four degrees of functional module separation that are incorporated as required by the amount of increased space required.

Figure 1A:
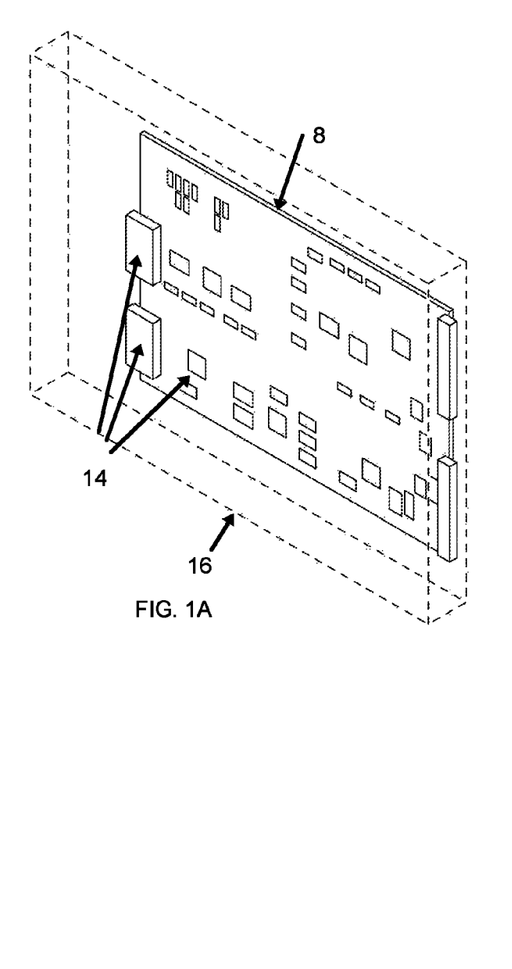
FIG. 1A shows a single enclosure with a single board including modules for conducting electronic signal testing.
Figure 1B:
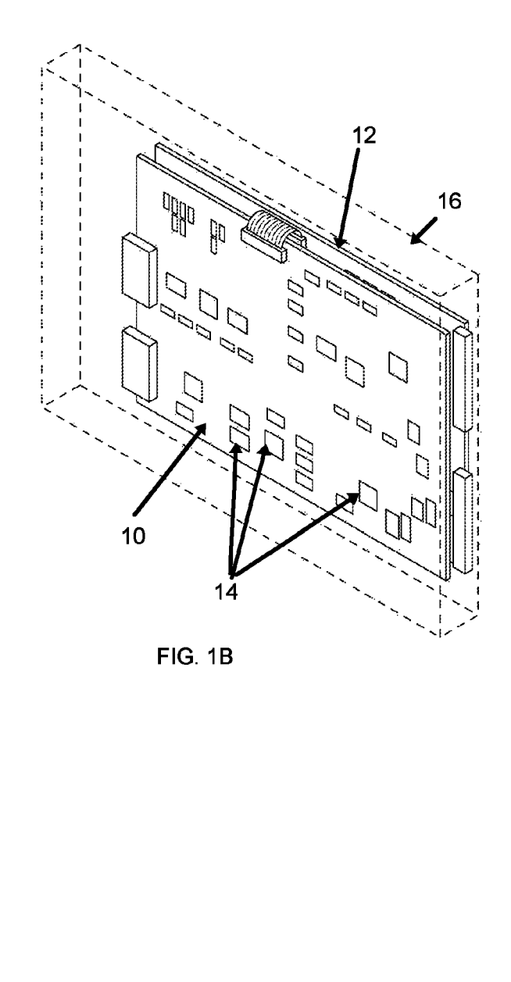
FIG. 1B shows a single enclosure with two boards including modules for conducting electronic signal testing.

Referring first to FIG. 1B, a first degree of separation is for instances where the physical space required by the desired functional modules (those listed above and described more fully in the '218 patent) is slightly larger than the available real estate on a single circuit board 8 within a single enclosure 16 (the embodiment shown in FIG. 1A and disclosed in the '218 patent). Thus, in a basic embodiment of a video asset in accordance with the invention, there are two printed circuit boards 10, 12 and functional modules 14 separated and placed upon one or both circuit board 10, 12. Each of the two circuit boards 10, 12 may be either full-size or partial-size and exist within an interior of the same single enclosure 16 in a stacked-style arrangement. Other embodiments of the video asset in accordance with the invention are described below.

The functional modules 14 may be entirely placed on one of the circuit boards 10, 12, with no functional modules 14 on the other circuit board 10, 12 (which would then be considered a dummy circuit board), or different parts of the functional modules 14 may be placed on each circuit board 10, 12. The functional modules 14 are also considered primary elements as this term is used herein and include those mentioned above, e.g., a primary composite video generation module, a digital video generation module, a raster video generation module, a stroke video generation module, a secondary composite video generation module, a real time video capture module with analysis capabilities, a real time video reformat and/or video redisplay module, and a bus interface module (including, but not limited to, VXI, MXI-2, LXI, PCI, PXI, PCI-e). These primary elements or functional modules 14 are described in the '218 patent or any patent applications incorporated by reference therein, all of which are incorporated by reference into the present application.

Remaining structure of the circuit boards 10, 12 is as disclosed in the '218 patent, e.g., the electronic connections and couplings, the interfaces to external components, etc. The circuit boards 10, 12 are used in all of the embodiments described herein, i.e., placed into the interior of the enclosures described below.

Figure 2:
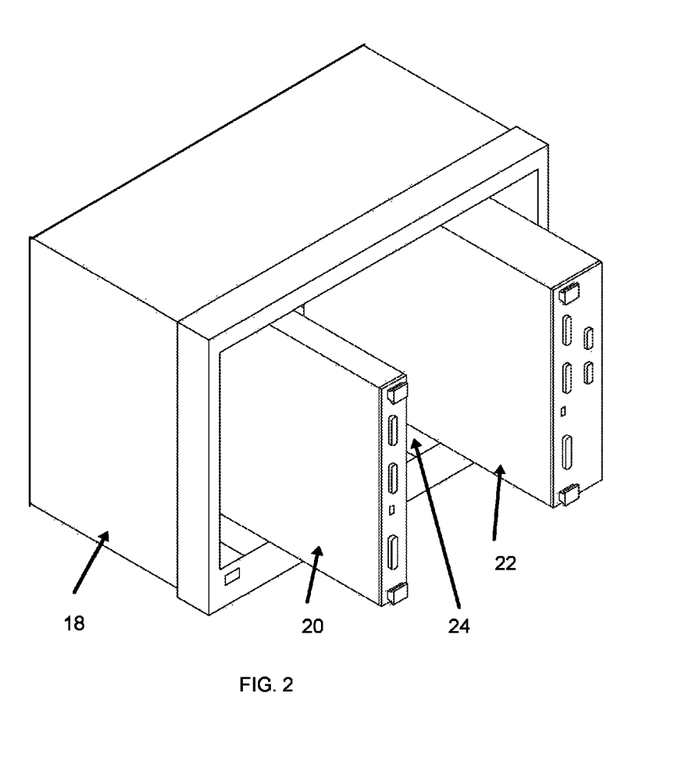
FIG. 2 shows a piece of automatic test equipment with a enclosure spanning a single slot and an enclosure spanning two slots, with the modules for conducting electronic signal testing being arranged in each enclosure.

Referring to FIG. 2, a second degree of separation defines that the multiple circuit board arrangement from the first degree of separation, shown in FIG. 1B, is modified to be enclosed within an interior of a two or more slot single enclosure. As shown in FIG. 2, a chassis 18 includes an aperture 24 with enclosure-receiving structure known to those skilled in the automatic test equipment field. Enclosure 20 is a single slot enclosure, i.e., the enclosure is dimensioned to extend across only a single slot of the chassis 18, whereas enclosure 22 is a two slot enclosure, i.e., the enclosure is dimensioned to extend across two slots of the chassis 18. Selection of the single slot enclosure 20 or the two slot enclosure 22 may be based on the available space in the chassis 18.

Figure 3:
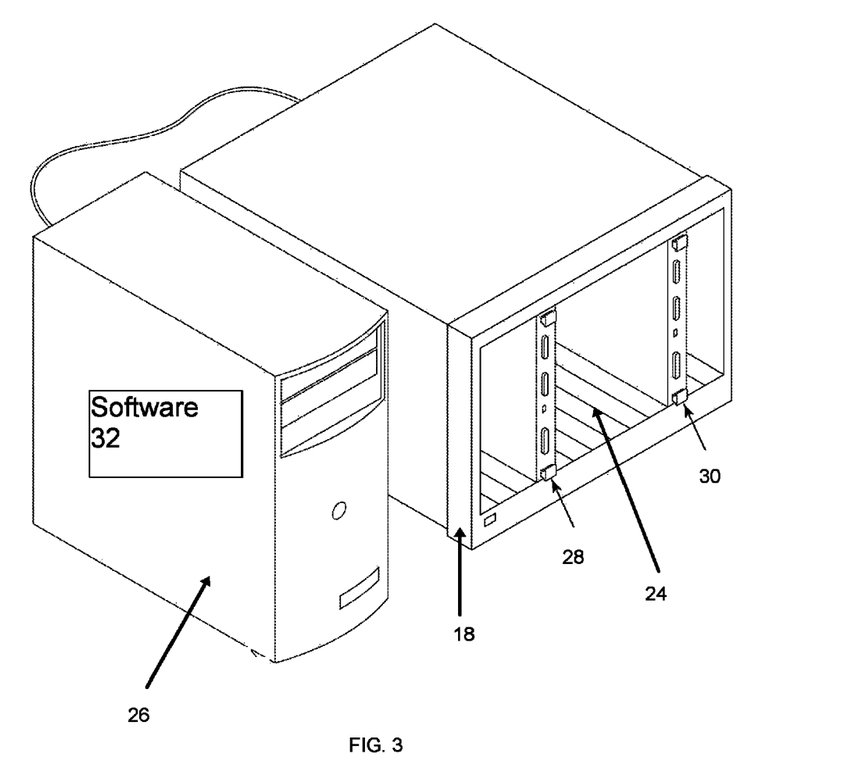
FIG. 3 shows a system in which a single software interface of one computer controls two enclosures separated from one another in a common chassis, with the modules for conducting electronic signal testing being arranged entirely in one of the enclosures or partly in both enclosures.
Figure 4:
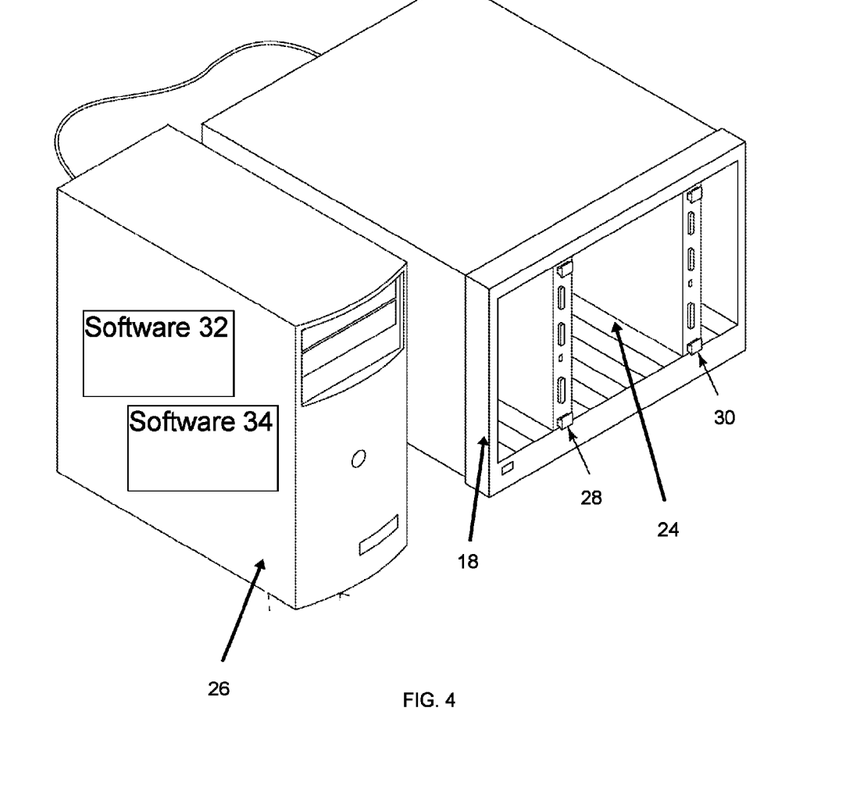
FIG. 4 shows a system in which multiple software interfaces of one computer control two enclosures separated from one another in a common chassis, with the modules for conducting electronic signal testing being arranged entirely in one of the enclosures or partly in both enclosure.

Referring now to FIGS. 3 and 4, a third degree of separation incorporates a separation of the multiple slot single enclosure (enclosure 22 in FIG. 2) into two or more enclosures of appropriate size. FIGS. 3 and 4 show two enclosures 28, 30 in the aperture 24 of the chassis 18 and a computer 26 coupled to the enclosures 28, 30, directly or indirectly through the chassis 24. Computer 26 is adapted, in any manner, to be connected to a monitor (not shown) and to one or more user interfaces (not shown). It is understood though that the depiction of two enclosures 28, is for sake of illustration only and three or more enclosures may be provided. Further, the computer 26 is depicted like a desktop but any processor or processing unit may be used as or instead of the computer 26. Functional modules 14 are thus each arranged on one or more printed circuit boards in an interior of one of the enclosures 28, 30.

In a preferred embodiment shown in FIG. 3, the separate enclosures 28, 30 are all controlled by a single software interface 32 in the computer 26 that creates the appearance of working with a homogenous video instrument despite the distribution of its functional modules into a plurality of enclosures 28, 30. In yet another embodiment shown in FIG. 4, the separate enclosures 28, 30 are controlled by individual software interfaces 32, 34, respectively, in the computer 26. When the software interfaces 32, 34 are combined together, they provide the services of a homogenous video instrument. Combining the software interfaces 32, 34 together means that the processor in the computer 26 interacts with both software interfaces 32, 34 in order to generate commands for the two enclosures 28, 30 to effect the electronic signal testing.

Figure 5:
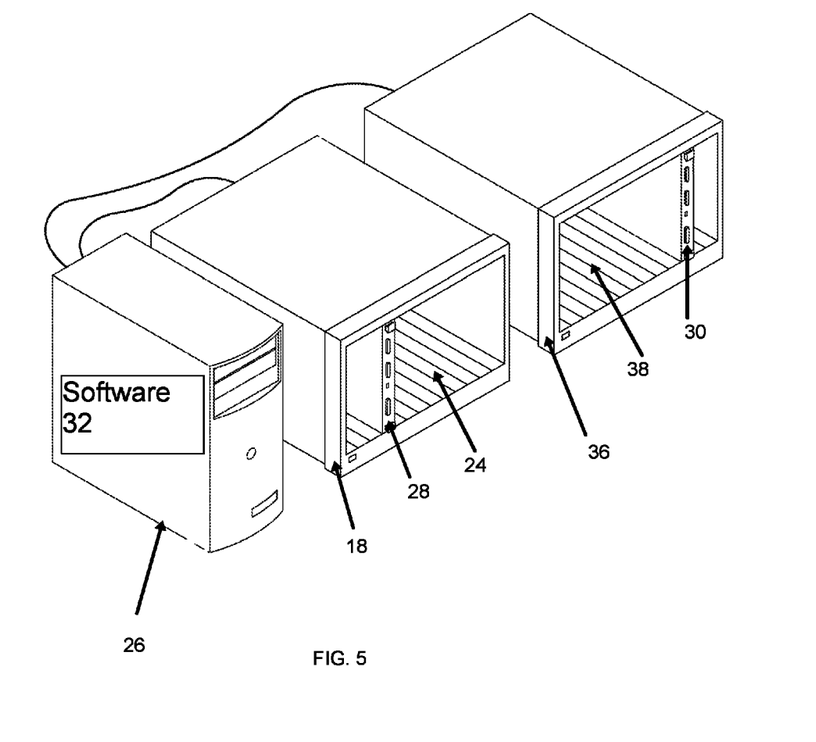
FIG. 5 shows a system in which a single software interfaces of one computer control two enclosures separated from one another in separate chassis, with the modules for conducting electronic signal testing being arranged entirely in one of the enclosures or partly in both enclosure.
Figure 6:
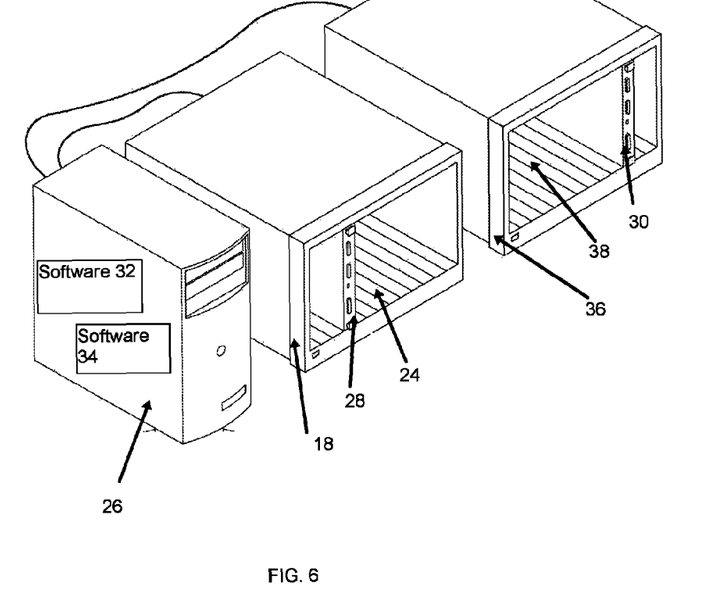
FIG. 6 shows a system in which multiple software interfaces of one computer control two enclosures separated from one another in separate chassis, with the modules for conducting electronic signal testing being arranged entirely in one of the enclosures or partly in both enclosure.

Referring now to FIGS. 5 and 6, a fourth degree of separation incorporates a separation of the two or more separate enclosures and locates them into separate interconnected instrument chassis. This method is intended for instances where the instrument space is available but distributed over many instrument chassis. Thus, in addition to chassis 18 with aperture 24 and enclosure-receiving structure known to those skilled in the automatic test equipment field, these embodiments also include an additional chassis 36 with aperture 38 and enclosure-receiving structure. Enclosure 28 is arranged in chassis 18 and enclosure 30 is arranged in chassis 36. Functional modules 14 are thus each arranged on one or more printed circuit boards in an interior of one of the enclosures 28, 30.

In a preferred embodiment shown in FIG. 5, the separate enclosures 28, 30 are all controlled by a single software interface 32 in the computer 26 that creates the appearance of working with a homogenous video instrument despite the distribution of its functional modules into a plurality of enclosures 28, 30 each of which is situated in a different chassis 18, 36, respectively. In yet another embodiment shown in FIG. 6, the separate enclosures 28, 30 are controlled by individual software interfaces 32, 34, respectively, in the computer 26. When the software interfaces 32, 34 are combined together, they provide the services of a homogenous video instrument. Combining the software interfaces 32, 34 together means that the processor in the computer 26 interacts with both software interfaces 32, 34 in order to generate commands for the two enclosures 28, 30 to effect the electronic signal testing.

It is considered part of the invention that the functional modules 14 may be distributed over two or more enclosures, with the enclosures being situated in a common chassis, or in different chassis. The depiction of two enclosures in a common chassis or in two different chassis is for illustration only and it is possible to distribute the functional modules over, for example, three enclosures, which are arranged all in a common chassis, in two chassis with one chassis having one enclosure and the other chassis having two enclosures, or in three chassis with each chassis including a single enclosure. As the functional modules are distributed onto more than three enclosures, the possible arrangement of the enclosures and number of chassis varies.

Furthermore, the number of software interfaces may vary, from a single software interface controlling all of the functional modules (see FIGS. 3 and 5), whether situated on a single enclosure or plurality of enclosures and in the latter case whether situated in a single chassis (FIG. 3) or multiple chassis (FIG. 5), to a plurality of software interfaces controlling the functional modules (see FIGS. 4 and 6), whether situated on a plurality of enclosures in a single chassis (FIG. 4) or multiple chassis (FIG. 6). These software interfaces 32, 34 may be situated in a common computer 26 as shown, or possibly in different computer or in different processing units if so desired.

Disclosed above is therefore a video processing arrangement including a computer adapted to connect to a monitor and a video asset coupled to the computer for generating video signals that can be displayed on the monitor when connected to the computer. The video asset includes at least one enclosure, e.g., enclosures 16, 20, 22, 28, 30, at least one circuit board 10, 12 arranged in an interior of the enclosure(s) 16, 20, 22, 28, 30. A plurality of primary elements, functional modules 14, are all arranged on the circuit board(s) 10, 12 in the interior of the enclosure(s) 16, 20, 22, 28, 30. The primary elements includes a primary composite video module for producing different types of a primary video signal and outputting the primary video signal via output channels and a secondary video source module for producing a secondary composite video signal and outputting the secondary composite video signal via output channels, wherein the secondary video source module produces the secondary composite video signal in an identical or different format than the primary video signal and different than the primary video signal. Alternative combinations of primary elements are possible, including one in which the primary elements includes a primary composite video module for producing different types of a primary video signal and outputting the primary video signal via output channels, and a real time capture module for capturing video signals in a plurality of different modes and that includes a plurality of identical input channels, each input channel being arranged to receive and format a respective input component of the same video signals.

Various of the arrangement are envisioned, and considered part of the invention. For example, there may be only a single circuit board, in an enclosure that spans two slots (see enclosure 22 in FIG. 2). There may be two circuit boards in an enclosure spanning a single slot (see enclosure 20 in FIG. 2) or in an enclosure that spans two slots (see enclosure 22 in FIG. 2). There may be multiple circuit boards in multiple enclosures wherein each enclosure includes at least one circuit board (see enclosures 28, 30 in FIGS. 3-6). These enclosures may span a single slot and be arranged in a common chassis (see FIGS. 3 and 4), or be arranged in different chassis (see FIGS. 5 and 6). In either case, a common software interface in the computer 26 communicates with and controls the enclosures 28, 30, i.e., the functional modules 14 therein, to enable the functional modules 14 on the circuit boards 10, 12 to function together as the video asset (see software interface 32 in FIGS. 3 and 5). Alternatively, a plurality of software interfaces in the computer 26 communicate with and control the enclosures 28, 30 (on a one-to-one basis or otherwise) to enable the functional modules 14 on the circuit boards 10, 12 to function together as the video asset (see software interfaces 32, 34 in FIGS. 4 and 6).

The functional elements 14 on the circuit boards 10, 12 may include a real time capture module for capturing video signals in a plurality of different modes and that is optionally arranged to read back a captured, fully formatted image for analysis or redisplay. Another primary element is a stroke generator module for generating a stroke XYZ video signal and outputting the stroke video signal via output channels.

Having thus described a few particular embodiments of the invention, various alterations, modifications, and improvements will readily occur to those skilled in the art. For instance, the invention can be adapted to instrumentation other than for video testing. Furthermore, the invention may be modified by changing the number of circuit cards contained within the enclosures. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the claims and equivalents thereto.

What is claimed is:

1. A video processing arrangement, comprising:
   a computer adapted to connect to a monitor; and
   a video asset coupled to said computer for generating video signals that can be displayed on the monitor when connected to said computer,
   said video asset comprising:
      at least one enclosure;
      at least one circuit board arranged in an interior of said at least one enclosure; and
      a plurality of functional modules all arranged on said at least one circuit board in the interior of said at least one enclosure, said functional modules including:
         a primary composite video module for producing different types of a primary video signal and outputting the primary video signal via output channels, and
         a secondary video source module for producing a secondary composite video signal and outputting the secondary composite video signal via output channels, said secondary video source module being arranged to produce the secondary composite video signal in an identical or different format than the primary video signal and different than the primary video signal.

2. The arrangement of claim 1, wherein said at least one circuit board consists of a single circuit board and said at least one enclosure consists of a single enclosure.

3. The arrangement of claim 2, further comprising a chassis onto which said at least one enclosure is mounted, said chassis having a plurality of slots, said single enclosure spanning a plurality of said slots of said chassis.

4. The arrangement of claim 1, wherein said at least one circuit board consists of two circuit boards and said at least one enclosure consists of a single enclosure.

5. The arrangement of claim 4, further comprising a chassis onto which said single enclosure is mounted, said chassis having a plurality of slots, said single enclosure spanning at least one of said slots of said chassis.

6. The arrangement of claim 1, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
   a common software interface in said computer that controls said enclosures to enable said functional modules on said circuit boards to function together as the video asset.

7. The arrangement of claim 1, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
   a plurality of software interfaces in said computer that control said enclosures to enable said functional modules on said circuit boards to function together as the video asset.

8. The arrangement of claim 1, wherein said at least one circuit board comprises a plurality of circuit boards and said at least one enclosure comprises a plurality of enclosures, each of said enclosures including at least one of said printed circuit boards, further comprising
   a plurality of chassis each having a plurality of slots, at least one of said enclosures being mounted on each of said chassis and each of said enclosures spanning at least one of said slots of said chassis; and
   a common software interface in said computer that controls said enclosures to enable said functional modules on said circuit boards to function together as the video asset.

9. The arrangement of claim 1, wherein said at least one circuit board comprises a plurality of circuit boards and said at least one enclosure comprises a plurality of enclosures, each of said enclosures including at least one of said printed circuit boards, further comprising
   a plurality of chassis each having a plurality of slots, at least one of said enclosures being mounted on each of said chassis and each of said enclosures spanning at least one of said slots of said chassis; and
   a plurality of software interfaces in said computer that control said enclosures to enable said functional modules on said circuit boards to function together as the video asset.

10. The arrangement of claim 1, wherein said functional modules of said video asset further comprise a real time capture module for capturing video signals in a plurality of different modes and optionally reading back a captured, fully formatted image for analysis or redisplay.

11. The arrangement of claim 10, wherein said at least one circuit board consists of a single circuit board and said at least one enclosure consists of a single enclosure.

12. The arrangement of claim 11, further comprising a chassis onto which said at least one enclosure is mounted, said chassis having a plurality of slots, said single enclosure spanning a plurality of said slots of said chassis.

13. The arrangement of claim 10, wherein said at least one circuit board consists of two circuit boards and said at least one enclosure consists of a single enclosure.

14. The arrangement of claim 13, further comprising a chassis onto which said single enclosure is mounted, said chassis having a plurality of slots, said single enclosure spanning at least one of said slots of said chassis.

15. The arrangement of claim 10, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
   a common software interface in said computer that controls said enclosures to enable said functional modules on said circuit boards to function together as the video asset.

16. The arrangement of claim 10, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
   a plurality of software interfaces in said computer that control said enclosures to enable said functional modules on said circuit boards to function together as the video asset.

17. The arrangement of claim 10, wherein said at least one circuit board comprises a plurality of circuit boards and said at least one enclosure comprises a plurality of enclosures, each of said enclosures including at least one of said printed circuit boards, further comprising
   a plurality of chassis each having a plurality of slots, at least one of said enclosures being mounted on each of said chassis and each of said enclosures spanning at least one of said slots of said chassis; and
   a common software interface in said computer that controls said enclosures to enable said functional modules on said circuit boards to function together as the video asset.

18. The arrangement of claim 10, wherein said at least one circuit board comprises a plurality of circuit boards and said at least one enclosure comprises a plurality of enclosures, each of said enclosures including at least one of said printed circuit boards, further comprising
   a plurality of chassis each having a plurality of slots, at least one of said enclosures being mounted on each of said chassis and each of said enclosures spanning at least one of said slots of said chassis; and
   a plurality of software interfaces in said computer that control said enclosures to enable said functional modules on said circuit boards to function together as the video asset.

19. The arrangement of claim 1, wherein said functional modules of said video asset further comprise a stroke generator module for generating a stroke XYZ video signal and outputting the stroke video signal via output channels.

20. The arrangement of claim 19, wherein said at least one circuit board consists of a single circuit board and said at least one enclosure consists of a single enclosure.

21. The arrangement of claim 20, further comprising a chassis onto which said at least one enclosure is mounted, said chassis having a plurality of slots, said single enclosure spanning a plurality of said slots of said chassis.

22. The arrangement of claim 19, wherein said at least one circuit board consists of two circuit boards and said at least one enclosure consists of a single enclosure.

23. The arrangement of claim 22, further comprising a chassis onto which said single enclosure is mounted, said chassis having a plurality of slots, said single enclosure spanning at least one of said slots of said chassis.

24. The arrangement of claim 19, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
a common software interface in said computer that controls said enclosures to enable said functional modules on said circuit boards to function together as the video asset.

25. The arrangement of claim 19, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
a plurality of software interfaces in said computer that control said enclosures to enable said functional modules on said circuit boards to function together as the video asset.

26. The arrangement of claim 19, wherein said at least one circuit board comprises a plurality of circuit boards and said at least one enclosure comprises a plurality of enclosures, each of said enclosures including at least one of said printed circuit boards, further comprising
a plurality of chassis each having a plurality of slots, at least one of said enclosures being mounted on each of said chassis and each of said enclosures spanning at least one of said slots of said chassis; and
a common software interface in said computer that controls said enclosures to enable said functional modules on said circuit boards to function together as the video asset.

27. The arrangement of claim 19, wherein said at least one circuit board comprises a plurality of circuit boards and said at least one enclosure comprises a plurality of enclosures, each of said enclosures including at least one of said printed circuit boards, further comprising
a plurality of chassis each having a plurality of slots, at least one of said enclosures being mounted on each of said chassis and each of said enclosures spanning at least one of said slots of said chassis; and
a plurality of software interfaces in said computer that control said enclosures to enable said functional modules on said circuit boards to function together as the video asset.

28. The arrangement of claim 19, wherein said functional modules of said video asset further comprise a real time capture module for capturing video signals in a plurality of different modes and optionally reading back a captured, fully formatted image for analysis or redisplay.

29. A video processing arrangement, comprising:
a computer adapted to connect to a monitor; and
a video asset coupled to said computer for generating video signals that can be displayed on the monitor when connected to said computer,
said video asset comprising:
at least one enclosure;
at least one circuit board arranged in an interior of said at least one enclosure; and
a plurality of functional modules all arranged on said at least one circuit board in the interior of said at least one enclosure, said functional modules including:
a primary composite video module for producing different types of a primary video signal and outputting the primary video signal via output channels, and
a real time capture module for capturing video signals in a plurality of different modes, said real time capture module including a plurality of identical input channels, each of said input channels being arranged to receive and format a respective input component of the same video signals.

30. The arrangement of claim 29, wherein said at least one circuit board consists of a single circuit board and said at least one enclosure consists of a single enclosure.

31. The arrangement of claim 30, further comprising a chassis onto which said at least one enclosure is mounted, said chassis having a plurality of slots, said single enclosure spanning at least one of said slots of said chassis.

32. The arrangement of claim 29, wherein said at least one circuit board consists of two circuit boards and said at least one enclosure consists of a single enclosure.

33. The arrangement of claim 32, further comprising a chassis onto which said single enclosure is mounted, said chassis having a plurality of slots, said single enclosure spanning at least one of said slots of said chassis.

34. The arrangement of claim 29, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
a common software interface in said computer that controls said enclosures to enable said functional modules on said circuit boards to function together as the video asset.

35. The arrangement of claim 29, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising
a plurality of software interfaces in said computer that control said enclosures to enable said functional modules on said circuit boards to function together as the video asset.

36. The arrangement of claim 29, wherein said at least one circuit board comprises a plurality of circuit boards and said at least one enclosure comprises a plurality of enclosures, each of said enclosures including at least one of said printed circuit boards, further comprising
a plurality of chassis each having a plurality of slots, at least one of said enclosures being mounted on each of said chassis and each of said enclosures spanning at least one of said slots of said chassis; and a common software interface in said computer that controls said enclosures to enable said functional modules on said circuit boards to function together as the video asset.

37. The arrangement of claim 29, wherein said at least one circuit board comprises a plurality of circuit boards and said at least one enclosure comprises a plurality of enclosures, each of said enclosures including at least one of said printed circuit boards, further comprising a plurality of chassis each having a plurality of slots, at least one of said enclosures being mounted on each of said chassis and each of said enclosures spanning at least one of said slots of said chassis; and a plurality of software interfaces in said computer that control said enclosures to enable said functional modules on said circuit boards to function together as the video asset.

38. The arrangement of claim 29, wherein said functional modules of said video asset further comprise a stroke generator module for generating a stroke XYZ video signal and outputting the stroke video signal via output channels.

39. The arrangement of claim 38, wherein said at least one circuit board consists of a single circuit board and said at least one enclosure consists of a single enclosure.

40. The arrangement of claim 39, further comprising a chassis onto which said at least one enclosure is mounted, said chassis having a plurality of slots, said single enclosure spanning at least one of said slots of said chassis.

41. The arrangement of claim 38, wherein said at least one circuit board consists of two circuit boards and said at least one enclosure consists of a single enclosure.

42. The arrangement of claim 41, further comprising a chassis onto which said single enclosure is mounted, said chassis having a plurality of slots, said single enclosure spanning at least one of said slots of said chassis.

43. The arrangement of claim 38, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising a common software interface in said computer that controls said enclosures to enable said functional modules on said circuit boards to function together as the video asset.

44. The arrangement of claim 38, wherein said at least one circuit board comprises a plurality of circuit boards and said at least one enclosure comprises a plurality of enclosures, each of said enclosures including at least one of said printed circuit boards, further comprising a chassis onto which said enclosures are mounted, said chassis having a plurality of slots, each of said enclosures spanning at least one of said slots of said chassis, further comprising a plurality of software interfaces in said computer that control said enclosures to enable said functional modules on said circuit boards to function together as the video asset.

45. The arrangement of claim 38, wherein said at least one circuit board comprises a plurality of circuit boards and said at least one enclosure comprises a plurality of enclosures, each of said enclosures including at least one of said printed circuit boards, further comprising a plurality of chassis each having a plurality of slots, at least one of said enclosures being mounted on each of said chassis and each of said enclosures spanning at least one of said slots of said chassis; and a common software interface in said computer that controls said enclosures to enable said functional modules on said circuit boards to function together as the video asset.

46. The arrangement of claim 38, wherein said at least one circuit board comprises a plurality of circuit boards and said at least one enclosure comprises a plurality of enclosures, each of said enclosures including at least one of said printed circuit boards, further comprising a plurality of chassis each having a plurality of slots, at least one of said enclosures being mounted on each of said chassis and each of said enclosures spanning at least one of said slots of said chassis; and a plurality of software interfaces in said computer that control said enclosures to enable said functional modules on said circuit boards to function together as the video asset.

* * * * *